United States Patent
Templeman et al.

(10) Patent No.: US 8,197,911 B2
(45) Date of Patent: Jun. 12, 2012

(54) METHOD OF APPLYING POLYMER COATING TO A SUBSTRATE

(75) Inventors: Cynthia G. Templeman, Ypsilanti, MI (US); Eric M. Leonard, Ann Arbor, MI (US); Beth Ann Ficek, Iowa City, IA (US); Alec B. Scranton, Coralville, IA (US)

(73) Assignees: Toyota Motor Engineering & Manufacturing North America, Inc., Erlanger, KY (US); University of Iowa Research Foundation, Iowa City, IA (US)

( * ) Notice: Subject to any disclaimer, the term of this patent is extended or adjusted under 35 U.S.C. 154(b) by 730 days.

(21) Appl. No.: 11/759,984

(22) Filed: Jun. 8, 2007

(65) Prior Publication Data

US 2008/0305273 A1     Dec. 11, 2008

(51) Int. Cl.
*C08F 2/50* (2006.01)
(52) U.S. Cl. .................. 427/517; 427/487; 427/508
(58) Field of Classification Search .................. 427/517, 427/487, 508
See application file for complete search history.

(56) References Cited

U.S. PATENT DOCUMENTS

| | | | |
|---|---|---|---|
| 2,823,143 A | | 2/1958 | Upperman |
| 3,535,151 A | | 10/1970 | Raffel |
| 4,880,662 A | | 11/1989 | Habrich et al. |
| 4,970,399 A | | 11/1990 | Habrich et al. |
| 4,998,502 A | | 3/1991 | Schucker |
| 5,274,148 A | * | 12/1993 | Dougherty et al. ............. 556/64 |
| 5,980,637 A | | 11/1999 | Singh et al. |
| 6,344,244 B1 | | 2/2002 | Schrof et al. |
| 6,471,778 B1 | | 10/2002 | Baltz et al. |

FOREIGN PATENT DOCUMENTS

JP      61098740      5/1986

* cited by examiner

*Primary Examiner* — Elena T Lightfoot
(74) *Attorney, Agent, or Firm* — Gifford, Krass, Sprinkle, Anderson & Citkowski, P.C.

(57) ABSTRACT

An object of complex three-dimensional configuration, such as an automotive vehicle body, is coated with a combination of a coating formulation and a photoactivated mixture containing active centers that have been produced prior to application. The two liquids can be intimately mixed prior to application to the object, or the coating formulation can be applied prior to the application of the photoactivated mixture. The coating formulation is cured by the active centers that have been produced prior to application.

8 Claims, 4 Drawing Sheets

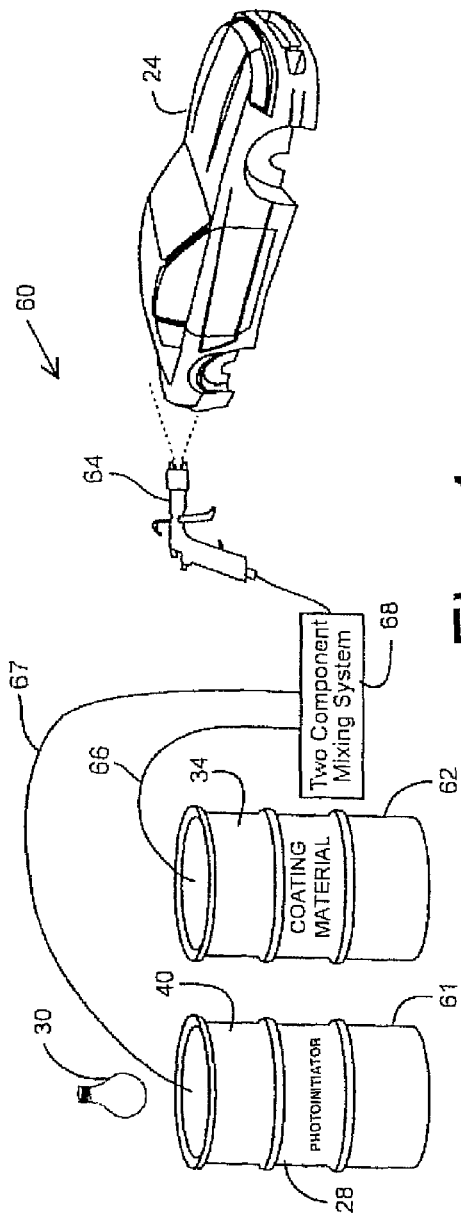
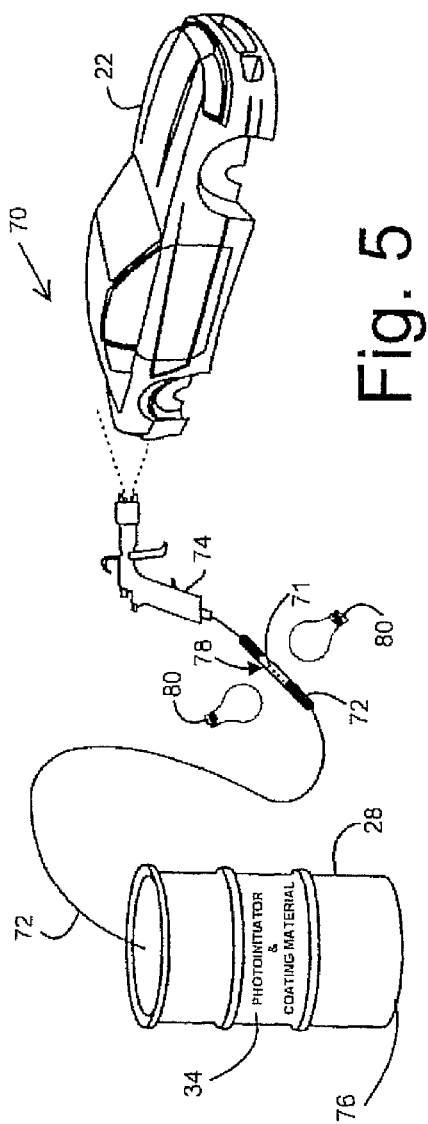

METHOD OF APPLYING POLYMER COATING TO A SUBSTRATE

FIELD OF THE INVENTION

This invention relates to a method and system for applying a photo activated polymer coating to a substrate.

BACKGROUND OF THE INVENTION

It is known to use polymer coatings on objects such as complex three-dimensional shapes. Typically, these coatings are produced using thermally activated polymerization. Heat is used to generate active centers. The active centers polymerize the coatings after a monomer has been applied to a substrate as a liquid. However, thermal polymerization requires tremendous amounts of time, energy and expense to run high-temperature ovens for extended periods of time.

It is also known to use photopolymerization to produce polymer coatings on objects. Photopolymerization reactions are chain reactions which generate free radical or cationic active centers. In photopolymerization, energy from UV or visible light is used to polymerize the monomer. Photopolymerization has a number of advantages, including savings in energy and high cure rates without the necessity of solvents.

However, photopolymerization of coatings on complex three-dimensional shapes has not been successful because of problems with oxygen inhibition and shadow regions. Previously known photopolymerization systems have used free radical polymerization to generate free radical active centers. Oxygen inhibition occurs when free radical active centers react with oxygen to produce unreactive peroxides and hydroperoxides. The effect is to decrease the polymerization rate and reduces the polymer molecular weight resulting in an incomplete cure. To overcome this problem, coating systems are purged with nitrogen in an attempt to displace oxygen from the monomer coated surface. While this removes most of the oxygen and allows photopolymerization to occur on flat substrates, it is difficult to purge oxygen from recessed regions, resulting in poor polymerization in these areas.

Problems also occur as the result of shadows from incomplete illumination of the coating material on the substrate during photopolymerization. Typically, photopolymerization is carried out by mixing a monomer, a photoinitiator and any additives to the application. The mixture is then applied on to the substrate, followed by illumination from a light source, to start the photochemical process. Active centers are produced when the photons from the light are absorbed. Therefore, each area of the substrate must be exposed to light. This is difficult to accomplish with complex shapes. Any region not exposed or lying in the shadow will have an absence of active centers. Therefore, the material remains in an uncured state. Multiple illumination sources, moving illumination sources and moving substrate sources have been used in an attempt to overcome this problem.

SUMMARY OF THE INVENTION

Accordingly, the invention relates to a method of effectively producing a polymerized coating on a substrate, a system to produce the coating using the method, and an apparatus for use with the system. The method is particularly useful for coating objects having complex three dimensional shapes such as vehicle bodies. The method includes the steps of providing a supply of photoinitiator, photochemically activating the supply of photoinitiator to form a pre-activated photoinitiator, applying the pre-activated photoinitiator to the substrate; and polymerizing a bulk coating formulation with the pre-activated photoinitiator to form the polymerized coating on the substrate.

In a first embodiment of the invention, the supply of photoinitiator is subject to radiant energy in a reservoir to form a pre-activated photoinitiator. The bulk coating formulation is sprayed onto the substrate and the preactivated photoinitiator is sprayed onto the bulk coating formulation. The cationic active centers of the pre-activated photoinitiator react with the bulk coating formulation to begin a process of polymerization without any added energy, such as light or heat.

In a second embodiment of the invention, the pre-activated photoinitiator is mixed with the bulk coating formulation and applied or sprayed as a mixture to the substrate where polymerization occurs.

In a third embodiment of the invention, photoinitiator is supplied to an applicator from a reservoir through a feed line. The feed line is opaque, however, the feed line has a light transmissive portion near the applicator. A light source is placed adjacent to the light transmissive portion to pass incident radiation (UV or visible light) through the light transmissive portion to photochemically activate the photoinitiator as it is being delivered to the applicator.

In a fourth embodiment of the invention, the photoinitiator is activated by irradiation (UV or visible light) when sprayed from an applicator prior to being applied to the substrate. The photoinitiator may be mixed with the bulk coating material when sprayed from the applicator and photochemically activated.

BRIEF DESCRIPTION OF THE DRAWINGS

FIG. 4 is a schematic view of a second embodiment of the invention where mixing occurs prior to application;

FIG. 5 is a schematic view of a third alternative embodiment of the invention where photopolymerization is initiated in a line supplying an applicator;

DETAILED DESCRIPTION OF THE PREFERRED EMBODIMENTS

Figure 1:
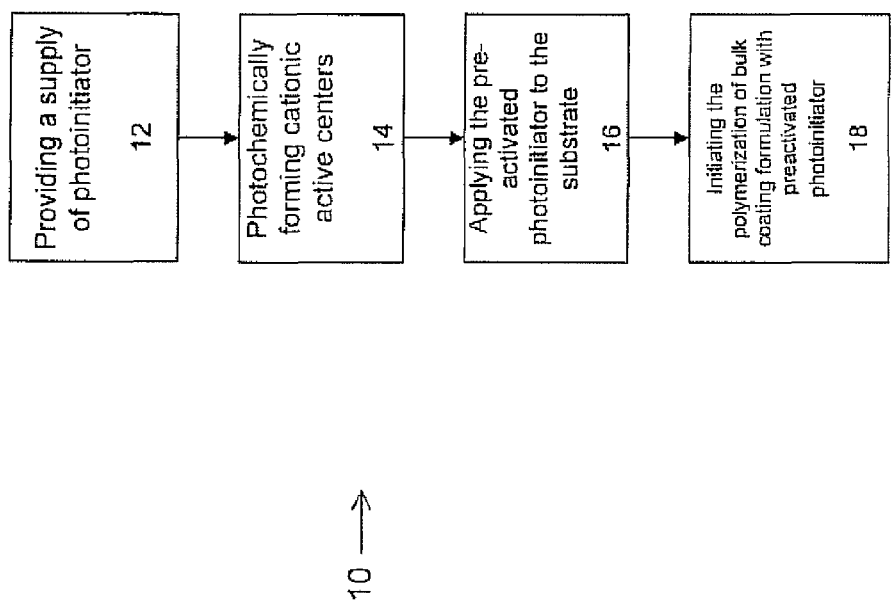
FIG. 1 is a flowchart showing the steps of the method of coating.

A method 10 of applying a coating to a substrate, such as a complex three dimensional object is shown in FIG. 1. The method 10 includes providing a supply of a cationic photoinitiator 12, photochemically activating the supply of photoiniatiator to provide a pre-activated photoinitiator 14, applying the pre-activated photoinitiator to the substrate 16, and polymerizing the bulk coating formulation with the pre-activated photoinitiator to form a polymerized coating on the substrate 18.

Figure 2:
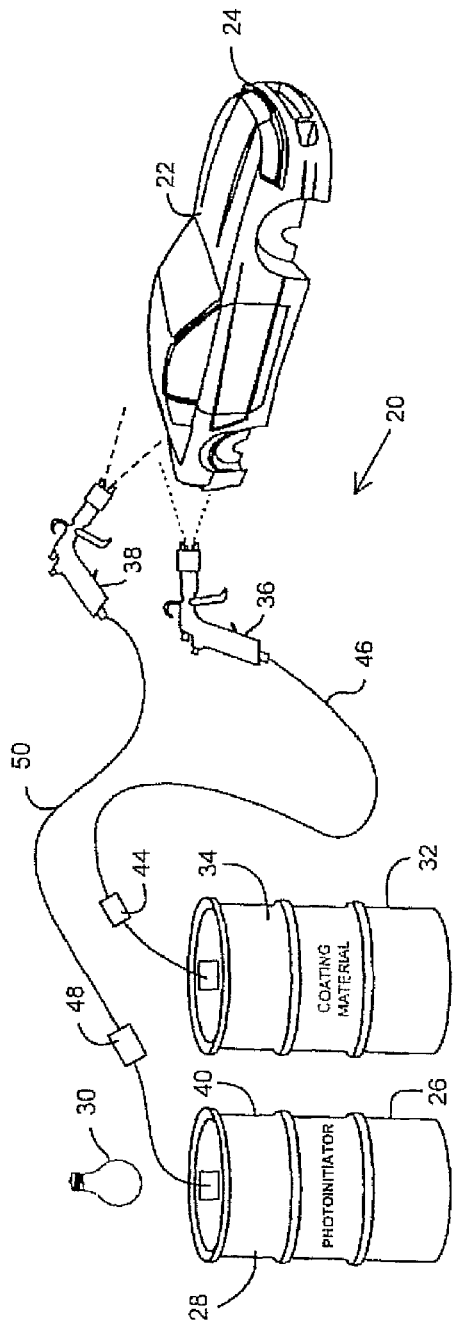
FIG. 2 is a schematic view illustrating a first embodiment of a process for coating a substrate.

As shown in FIG. 2, an embodiment of a system 20 for use with the method 10 includes forming a coating 22 on a substrate 24, such as a vehicle body. The system includes a reservoir such as a drum 26 of cationic photoinitiator 28, a light source 30, a reservoir such as a drum 32 of bulk coating formulation 34 and applicators 36 and 38.

The cationic photoinitiator 28 may be of any type capable of forming cationic active centers when subjected to a suitable radiation. The photoinitiator may be a liquid or a solid. If the photoinitiator 28 is a solid, it may be dissolved in an appropriate solvent or in a monomer. If the photoinitiator is dissolved in a monomer, the process must be designed with the polymerization rate in mind to assure that the solution containing the activated photoinitiator is at an appropriate state of polymerization (typically with sufficient unreactive monomer) at the time it reaches the applicator 36.

If the photoinitiator 28 is dissolved in solvent, the active centers of the activated photoinitiator do not begin any polymerization and remain active until the active centers migrate into the bulk coating formulation 34. This means that the photoinitiator can be activated much in advance of the actual spray process. Once it is sprayed on top of the bulk coating material, the solvent will evaporate which will cause the active centers to come in contact with the bulk coating material. If the photoinitiator is dissolved in a monomer instead of a solvent, there will not be any solvent to evaporate; rather, the activated photoinitiator will begin polymerization of the monomer in which it is dissolved immediately upon irradiation from the light source. As such, the photoinitiator cannot typically be activated far in advance of the application process.

Figure 3:
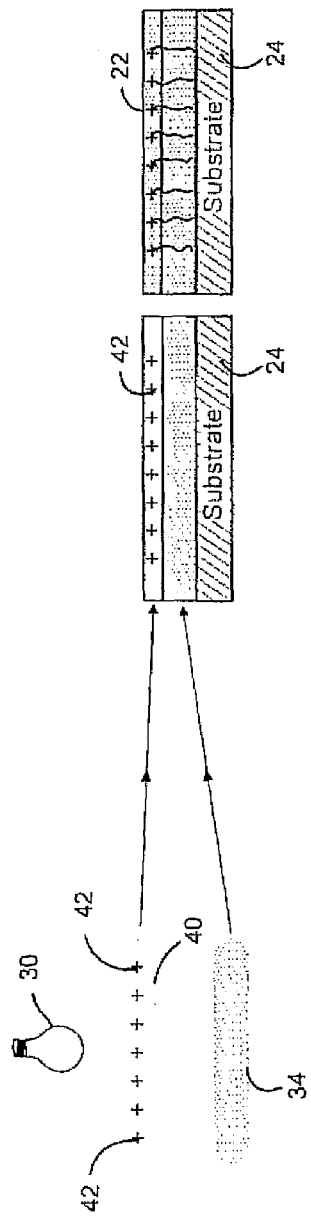
FIG. 3 is a schematic view showing the formation of cationic active centers and the polymerization process according to the embodiment of the first invention.

The light source or lamp 30 for irradiation of the photoinitiator 28 is placed near the drum 26. The lamp 30 may produce UV or visible light, depending upon the photoinitiator used. As shown in FIG. 3, irradiation from the lamp 30 forms pre-activated photoinitiator 40 with cationic active centers 42. The active centers 42 remain in this form until applied to the bulk coating formulation 34 where a polymerization reaction between the activated photoinitiator and the bulk coating formulation begins to form the coating 22.

The bulk coating formulation 34 may contain monomer or oligomer plus additives, such as pigments, UV stabilizers, cross-linking agents, free radical quenchers, and other co-monomers. The pre-activation of the photoinitiator permits the addition of pigments and other additives in the bulk coating formulation because these additives have no influence on the creation of active centers. A pump 44 is utilized to transfer the bulk coating formulation 34 through a line 46 to the applicator 36, such as a spray gun. The bulk coating formulation is then applied to the substrate. The pre-activated photoinitiator is then moved by pump 48 from drum 26 through a line 50 to a second applicator 38, such as a spray gun, where it is applied over the bulk coating formulation. As shown in FIG. 3, the cationic active centers of the activated photoinitiator begin the polymerization reaction with the bulk coating formulation.

A second embodiment of a system 60 for applying a coating is shown in FIG. 4. A two component mixing system 68 receives a bulk coating formulation 34 from the reservoir 62 through a line 66 and pre-activated photoinitiator 40 from a drum 61 through a line 67. The photoinitiator is pre-activated by lamp 30 as discussed for the previous embodiment. In this embodiment, the pre-activated photoinitiator 40 is mixed with the bulk coating formulation 34 in the two component mixing system 68 before application to the substrate 24. Such two component mixing systems are also known as 2K mixing systems. The mixture is sprayed by applicator 64 on to the substrate 24 immediately after mixing. The active centers formed during illumination by lamp 30 initiate a polymerization reaction with the bulk coating formulation on the substrate 24 to form the coating.

As shown in FIG. 5, a third embodiment of a coating system 70 includes an apparatus for activating photoinitiator in a feed line 72 for an applicator 74. The system 70 includes a reservoir, such as a drum 76, containing a mixture 71 of both a bulk coating formulation 34 and a cationic photoinitiator 28. The feed line 72 extends between pump (not shown) in the reservoir 76 and the applicator 74. The feed line 72 may be any conduit such as a pipe or hose. The feed line 72 is opaque with the exception of a small light transmissive portion 78 near the applicator 74. The light transmissive portion is translucent or transparent so that radiation from the lamp passes through the light transmissive portion. A radiant energy source or lamp 80 of appropriate intensity and type, based on the activation requirements of the photoinitiator, is positioned adjacent to the light transmissive portion 78. The mixture 71 is subjected to the radiant energy from the lamp 80 to form the active centers as mentioned above. The mixture is applied to the substrate 24 from the applicator 74 and the polymerization process proceeds on the substrate 24.

Figure 6:
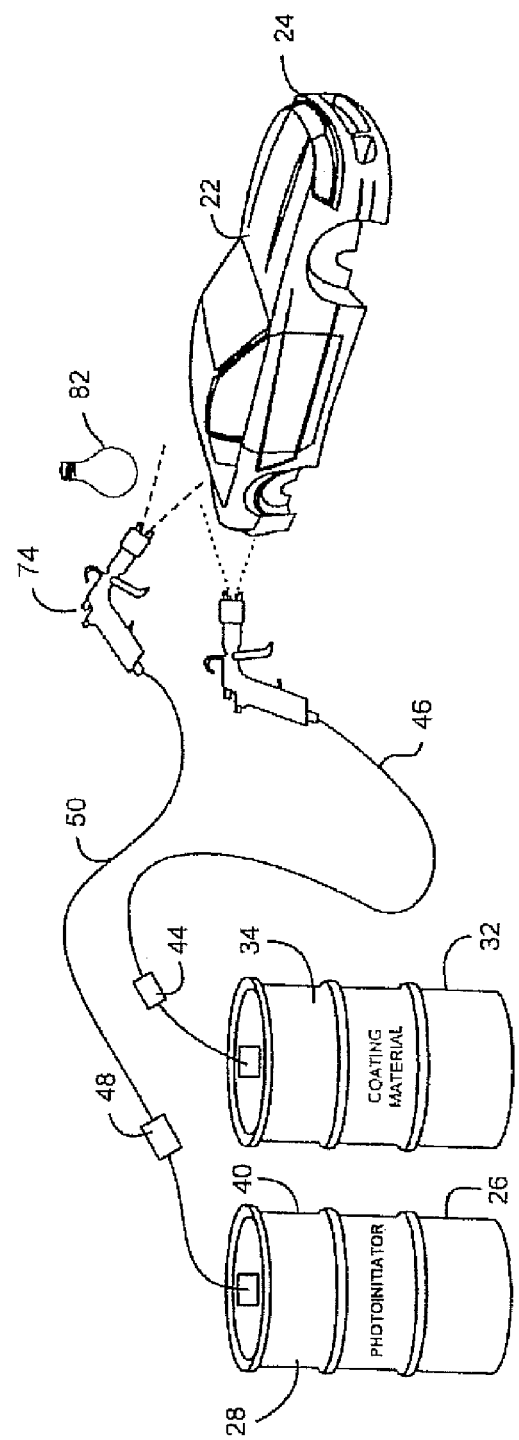
FIG. 6 is a schematic view of a fourth embodiment of the invention where activation of photoinitiator occurs in the spray.

A fourth alternative embodiment is shown in FIG. 6. In this embodiment, a lamp 82 is located between an applicator 74 and substrate 24 so that the cationic photoinitiator passes through the radiant energy as a spray just before application to the substrate 24. Alternatively, a mixture of cationic photoinitiator and bulk coating formulation may be subjected to irradiation as in the third alternative embodiment.

EXAMPLE I

A mixture of 0.5 mol % (tolycumyl) iodonium tetrakis (pentafluorophenyl) borate supplied by Rhodia, Inc. (commercial name: Rhodorsil 2074) and the cationic monomer 3,4-epoxycyclohexylmethanyl 3,4-epoxycyclohexanecarboxylate supplied by Dow Chemical Co. (commercial name: UVR 6105, Dow Chemical Co.) was mixed and illuminated for 2 minutes to photoactivate the photoinitiator and create the cationic active centers. A small amount (1.012 grams) of semi-polymerized monomer/activated photoinitiator was extracted from the mixture and placed on a 10 gram pool of the cationic monomer containing no initiator or active centers. The sample was not subsequently mixed. The sample was then placed in an oven at 50° C. to enhance the polymerization rate and active center migration. Within a day, the pre-activated active centers began to polymerize the pure monomer bulk as illustrated by visible strands of polymerized monomer that extended from the initial pre-activated mixture into the bulk monomer. After eight days the entire sample was fully polymerized with the initial polymer strands still visible. Control experiments on monomer containing unilluminated photoinitiator illustrated that no thermal polymerization occurred.

EXAMPLE II

A mixture of 0.5 mol % (tolycumyl) iodonium tetrakis (pentafluorophenyl) borate supplied by Rhodia, Inc. (commercial name: Rhodorsil 2074) in an inert solvent 1,1'-(1,1,3-Trimethyl-1,3-propanediyl)biscyclohexane supplied by Aldrich (product 465046) was mixed and illuminated for 10 minutes with continuous stirring. A small amount (~0.25 grams) of the solution containing now activated centers was extracted and placed on top of 1 gram of the cationic monomer 3,4-epoxycyclohexylmethanyl 3,4-epoxycyclohexanecarboxylate supplied by Dow Chemical Co. (commercial name: UVR 6105, Dow Chemical Co.) containing no initiator or active centers in a polystyrene cuvette. Six of these samples were made and placed in an oven at 50° C. to enhance the polymerization rate and active center migration. At the prescribed time (1, 2, 4, 8 and 24 hours), one of the samples was placed in tetrahydrofuran (THF) to dissolve the cuvette and monomer from the uncured region of the sample. The remaining crosslinked polymer was then washed with acetone to remove the any remaining THF and excess monomer. The polymer sample was dried and its weight was recorded. The weight of the polymer at 1, 2, 4, 8 and 24 hours were 0.0436, 0.1967, 0.2648, 0.2956, 0.3364 grams respectively. This indicates that the pre-activated cationic active centers produced in a separate step are moving from the pre-activation layer into the monomer layer below where they begin to polymerize the sample. Control experiments on monomer containing unilluminated photoinitiator illustrated that no thermal polymerization occurred.

EXAMPLE III

A Perkin-Elmer Differential Scanning Calorimeter-7 (DSC) modified for photo-experiments was used to monitor the reaction of the pre-activated active centers. The light source was a 200 W Oriel Hg(Xe) arc lamp at a total intensity of 55 mW/cm$^2$ and the beam was passed through a water filter outfitted with a thermostatted recirculating jacket to reduce infrared radiation and limit sample heating. Approximately 15 mg of the cationic monomer 3,4-epoxycyclohexylmethanyl 3,4-epoxycyclohexanecarboxylate supplied by Dow Chemical Co. (commercial name: UVR 6105. Dow Chemical Co.) containing no initiator or active centers was placed in an aluminum DSC pan held at 25° C. After the DSC began monitoring the reaction, approximately 3 μL of a previously mixed and illuminated (for 10 minutes with continuous stirring) solution of 0.5 mol % (tolycumyl) iodonium tetrakis (pentafluorophenyl) borate supplied by Rhodia, Inc. (commercial name: Rhodorsil 2074) in acetone was added into the aluminum pan and not mixed. The heat of polymerization was recorded for 25 minutes (after which the reaction slowed to a rate where the DSC could no longer monitor it). The DSC reaction showed a 0.0026 mol/L sec maximum polymerization rate with a 23% conversion in the 25 minutes. This study was repeated for methyl 3,4-epoxycyclohexanecarboxylate CAS#41088-52-2, bis(3-glycidoxypropyl)tetramethyldisiloxane CAS#126-80-7, and tri(ethylene glycol) divinyl ether CAS#765-12-8. These studies indicate that the pre-illumination of the photoinitiator solution produced active centers which remained active allowing polymerization of the monomer to occur once the solution was added.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

The invention claimed is:

1. A method of producing a polymerized coating on a substrate, the method comprising the steps of:
   providing a supply of bulk coating formulation having a polymerizable material;
   providing a separate supply of cationic photoinitiator;
   photochemically activating said supply of cationic photoinitiator in the absence of any polymerizable material to form a pre-activated photoinitiator having cationic active centers; and
   applying said pre-activated photoinitiator and said bulk coating formulation to the substrate;
   wherein said polymerizable material of said bulk coating formulation reacts with said pre-activated photoinitiator including said cationic active centers to form said polymerized coating on the substrate.

2. The method of claim 1, further comprising the step of:
   providing a two component mixing device;
   providing a first supply line from said supply of photoinitiator to said two component mixing device;
   providing a second supply line from said supply of bulk coating formulation to said two component mixing device; and
   mixing said bulk coating formulation with said pre-activated photoinitiator in said two component mixing device prior to applying to the substrate.

3. The method of claim 1 further comprising the step of applying said bulk coating formulation to the substrate before the step of applying said pre-activated photoinitiator to the substrate.

4. The method of claim 1 wherein the step of photochemically activating said supply of photoinitiator occurs in a reservoir separate from said supply of bulk coating formulation.

5. The method of claim 1 wherein the step of photochemically activating said supply of photoinitiator occurs in a line supplying an applicator.

6. The method of claim 1 wherein said supply of photoinitiator is dissolved in a solvent.

7. A method of forming a polymerized coating on a substrate, the method comprising the steps of:
   providing a supply of bulk coating formulation having a polymerizable material;
   applying said bulk coating formulation to the substrate;
   feeding a separate supply of cationic photoinitiator through a feed line to an applicator; said supply of photoinitiator being in the absence of any polymerizable material;
   directing a photoinitiator containing spray from said applicator toward the substrate;
   irradiating the photoinitiator containing spray between the applicator and the substrate to pre-activate the photoinitiator, said irradiation forming a pre-activated photoinitiator having cationic active centers; and
   polymerizing said polymerizable material of said bulk coating formulation with the pre-activated photoinitiator including said cationic active centers to form a polymerized coating on the substrate.

8. The method of claim 1, wherein said polymerizable material of said bulk coating formulation is a monomer which polymerizes with said pre-activated photoinitiator to form said polymerized coating.

* * * * *